E. E. F. CREIGHTON.
LIGHTNING ARRESTER.
APPLICATION FILED JULY 9, 1906.
923,024.
Patented May 25, 1909.
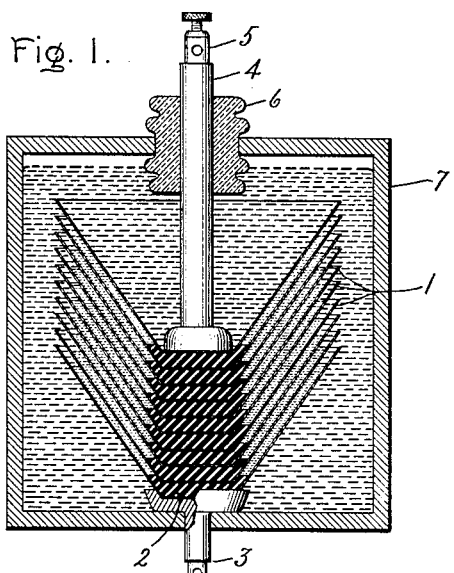
Fig. 1.
Fig. 2.
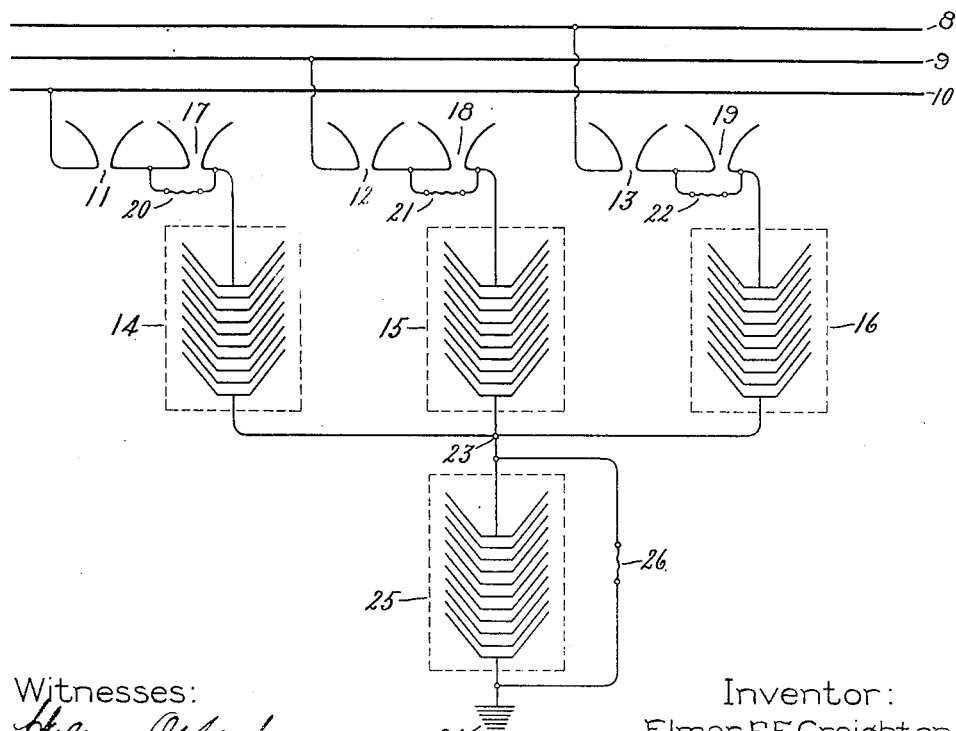
Witnesses:
Helen Orford
Arba B. Marvin Jr
Inventor:
Elmer E.F. Creighton,
by
Att'y.

UNITED STATES PATENT OFFICE.

ELMER E. F. CREIGHTON, OF SCHENECTADY, NEW YORK, ASSIGNOR, BY MESNE ASSIGNMENTS, TO GENERAL ELECTRIC COMPANY, A CORPORATION OF NEW YORK.

LIGHTNING-ARRESTER.

No. 923,024.     Specification of Letters Patent.     Patented May 25, 1909.

Application filed July 9, 1906. Serial No. 325,195.

*To all whom it may concern:*

Be it known that I, ELMER E. F. CREIGHTON, a citizen of the United States, residing at Schenectady, county of Schenectady, State of New York, have invented certain new and useful Improvements in Lightning-Arresters, of which the following is a specification.

This invention relates to means for protecting electrical distribution circuits from abnormal strains such for instance as may arise from lightning or other atmospheric disturbances, or from static, resonance or other phenomena arising from special conditions of the distribution circuit. Such abnormal strains are in general of a potential and frequency much higher than the normal potential and frequency of the distribution circuit.

My invention comprises what may be considered as a selective protecting device, permitting high frequency currents to pass with relative freedom but preventing an excessive line current from establishing itself through the device or from following through on a high potential high frequency discharge.

The operative embodiment of my invention, hereinafter described more in detail, includes an electrolytic condenser which, when properly arranged, possesses this selective action to a marked degree and also possesses various other advantageous features hereinafter pointed out.

My invention also embraces certain novel connections and arrangements of apparatus whereby the desired protective effect is insured.

My invention will be better understood by reference to the following description taken in connection with the drawing forming a part of this specification.

Figure 1 represents one form of electrolytic condenser suitable for use according to my invention: Fig. 2 is a diagrammatic representation showing my invention as applied to a three-phase distribution circuit.

The electrolytic apparatus illustrated in Fig. 1 comprises a plurality of conical aluminum dishes 1 nested one within another and separated by porcelain or other insulators 2. These insulators serve not only to electrically separate the plates, but also serve to keep the dishes in position one above another. A conducting rod 3 connects with the lower plate and serves as a means for connecting the conductors to ground or to any suitable part of the distribution system. A conducting rod 4 rests on and makes contact with the upper dish and is provided with a binding-post 5 for convenience in connecting the apparatus in circuit. A porcelain insulator 6 separates rod 4 from the inclosing box 7 within which the dishes are mounted. A suitable electrolyte is introduced between each pair of dishes so that the column as a whole comprises a series of aluminum plates separated by electrolyte. As an electrolyte I use a solution of citric acid for I find that this solution gives the apparatus a high capacity as a condenser and gives the aluminum plates a high breakdown resistance. The inclosing box 7 may be filled with oil to prevent arcing along the edges of the aluminum dishes.

The condenser action of the aluminum electrolytic condenser is usually attributed to the formation of a thin film of aluminum oxid or hydroxid on the aluminum plate because of the oxidizing action of the electrolyte when the aluminum plate is positive with respect to the electrolyte. This film is of extreme thinness and seems to be partially absorbed or eaten away from the plate when the condenser is inactive, though possibly it still remains and its apparent absence is due to the soaking up of the electrolyte by the film. At any rate the film does not appear to be present when current first flows between the plates but is developed after the expenditure of considerable electrical energy and thereafter offers a high resistance to the flow of current from the aluminum plate. With an electrolyte of citric acid the pressure between plates may be as high as 420 volts before the film breaks down and permits an appreciable current to flow between the plates.

If an alternating pressure is applied to the terminals 3 and 5, the apparatus operates as a true condenser and permits a certain quantity of current to pass to and from the terminals, the current being to a certain extent dependent on the frequency of the source. Although the insulating coating on the aluminum plates possesses a very high disruptive strength it is nevertheless of extreme thinness. As the capacity of the condenser is to a certain extent dependent on the thinness of the dielectric, an aluminum condenser possesses marked advantages over condensers of the ordinary type having a dielectric of mica or glass.

Not only is the storage capacity of the aluminum condenser very high in proportion to its size and weight, but it also possesses certain other characteristics entirely lacking in condensers of the ordinary type. Among these characteristics is the relation between the inductive capacity and the duration of the charging current. The capacity of the aluminum condenser is to a certain extent dependent on the time during which it has been in operation. When the condenser is first thrown in circuit the leakage through the condenser is considerably higher than that found after the condenser has been in operation for some little time. This phenomenon is probably due to the formation of the oxid or hydroxid coating by the oxidizing action of the leakage current, but whatever may be the principle underlying this phenomenon I find this characteristic of the aluminum condenser of great value when such a condenser is used according to this invention.

When the condenser is first thrown in circuit its low resistance, or high leakage, permits a relatively large quantity of energy to pass during the first instant of operation, and then, probably by oxidation, sufficient resistance is interposed to prevent excessive current of normal voltage from flowing. The exact time interval which is necessary to allow the condenser to rise from the condition of high leakage to that of low leakage is difficult to determine; but in some instances, I have found it to be less than 1/260 of a second with plates which had previously been subjected to the oxidizing action of current. Plates which have not thus been treated require a considerably longer time to build up to their maximum insulating capacity, such a long time in fact, that I consider it desirable in constructing the apparatus shown in Fig. 1 to subject the plates to a prolonged treatment with current to oxidize or otherwise "form" the plates and put them in condition for practical use in the system shown diagrammatically in Fig. 2.

I am aware that it has heretofore been proposed to "form" condenser plates by making them anodes in an oxidizing solution and permitting direct current to pass for some time, but I find that such treatment is not altogether satisfactory, probably because of impurities in the aluminum which are not removed from the surface of the plate by the direct current and which are present on the surface of the finished plate as small specks or irregularities. I find that this difficulty can be largely overcome by "forming" the plates with alternating current instead of direct current; possibly because of the scouring action which alternating current exerts on the surface of the aluminum plate.

I prefer to use as electrolyte, a solution of citric acid as I find that such a solution gives a film having a break-down voltage much higher than that of films produced with other and better known electrolytes.

After the films have once been formed and the apparatus has been assembled ready for use, the electrolyte seems to act in some way on the film and weaken or break it down in places. This phenomenon may be due to the corrosive action of the electrolyte, or possibly the acid is held as a mechanical mixture in the film, and this acid held between the particles of the aluminum oxid is decomposed or forced out by the first rush of current, thus reëstablishing the high resistance film. This reëstablishment takes place so quickly that no detrimental quantity of line-current can discharge through the condenser.

In addition to the peculiar features of the aluminum condenser above set forth, it possesses the characteristic of transmitting high frequency energy with much greater ease than low frequency currents. This feature is of importance in the use of these electrolytic condensers, for when the condensers are properly connected they act as selective devices to carry off the high frequency potential without permitting the normal current of the line to follow through on the high potential discharge.

The electrolytic condenser above described may be connected up in various ways for the protection of electric circuits, but the arrangement shown in Fig. 2 is suitable for a three-phase circuit, and is to be considered as typical of other arrangements which will readily suggest themselves to persons skilled in the art.

In Fig. 2 the three line conductors 8, 9 and 10 of the three-phase circuit are connected respectively to spark gaps 13, 12 and 11. The latter are separated from the three electrolytic condensers 14, 15 and 16 by auxiliary spark gaps 17, 18 and 19, which are shunted by the fuses 20, 21 and 22. The other ends of the electrolytic condensers are connected together at a common junction 23, and this is connected to ground 24 through an auxiliary condenser 25 shunted by the fuse 26. Spark gaps 17, 18 and 19 are in the nature of auxiliary devices and ordinarily do not come into action unless the line is accidentally grounded.

A high potential developed in any way on line conductor 10 will jump gap 11, and then pass through fuse 20, and the leaking condenser 14, through the junction 23, and from there to ground or to the other lines as the case may be. As a general thing the quantity of energy of such a high potential discharge is relatively small, and is not enough to completely develop the films on the aluminum plates of condenser 14, and consequently the entire high potential charge is absorbed in the electro-chemical action and the voltage across the condenser does not reach the maximum or break down voltage of approximately 420 volts per cell. There is, therefore, no opportunity for an excessive line current to follow through on the high potential discharge, and in case any line current does follow by leakage through the condenser the film resistance of the condenser is thereby built up and the current suppressed.

If the plate surface of the cell is not sufficient to absorb all the discharge when the voltage rises above the critical film voltage, the film resistance breaks down to a small fraction of its maximum resistance, and current flows freely through the cell. As soon, however, as the voltage decreases to the critical film voltage, the film resistance re-appears and chokes down the current to a value that can be extinguished by any well-known device commonly used for such purpose, as the horn gaps 11, 12 and 13. Since the voltage allowed per cell can be 75 per cent. or more of the critical film voltage, this quality of the aluminum film will limit the rise of the potential of the line to a value substantially 25 per cent. above normal line voltage.

It will be understood that the number of cells in each of the condensers shown in the drawing is properly proportioned to the voltage of the line. I find that the condensers may be safely used to within 20 per cent. of the break-down voltage, or in other words at a voltage of about 330 volts per cell.

If by any chance one of the line-wires becomes grounded, then the voltage across the single condenser in circuit on each phase is nearly twice that above mentioned, and some other protective means is desirable in the circuit. For this reason the auxiliary spark gaps 17, 18 and 19 are used. Under normal conditions they are not in circuit, but in case of an excessive flow of current due to grounding, the shunt fuse blows, and one or more of the spark gaps is thus put in series with the discharge path.

Condenser 25 is in the nature of an emergency device and ordinarily does not take current because of the shunt fuse 26. This extra condenser 25 comes into service only when one of the lines becomes grounded. It will be noted that if one of the phases is accidentally grounded, say phase 8, then condenser 16 will be cut out and double potential will be thrown on the condensers 14 and 15 and will thus bring the voltage per cell above the critical value. The cells are not ordinarily designed to take care of this excess of potential continuously and the current which leaks through is sufficient to melt fuse 26 and thereby introduce condenser 25 into the system to make the total number of condensers between line and line the same as under normal operation.

Certain of the features herein disclosed are claimed in a divisional application filed by me September 18, 1907, Serial No. 393,511.

What I claim as new, and desire to secure by Letters Patent of the United States, is,—

1. The combination with a high voltage line conductor subject to high potential strains, of a discharge path therefor including an electrolytic condenser comprising a plurality of liquid-tight aluminum cups arranged one within another, an electrolyte between said cups, and a body of insulating oil surrounding said cups.

2. The combination with the line conductors of a transmission system, of a condenser connected between each of said line conductors and ground, a spark gap associated with each condenser, and means for introducing said spark gap in series with said condenser when one of the line conductors becomes grounded.

3. The combination with the line conductors of a polyphase system and protective devices connecting all of said conductors to a common point, each of said protective devices comprising a current limiting device, a spark gap in series therewith and a fuse connected in parallel with said spark gap, of a discharge path from said common point to ground comprising a fuse and current limiting means connected in parallel with said fuse.

4. The combination with the line conductors of a three phase transmission system, of protective devices connecting all said conductors to a common point, a discharge path between said common point and ground including a fuse, and current limiting means in parallel with said fuse.

5. The combination with the line conductors of a transmission line, of protective devices connecting all said line conductors to a common point, a low resistance discharge path from said common point to ground, said path including a fuse, and current limiting means connected in parallel with said fuse.

6. The combination with the line conductors of a distribution circuit, of a discharge path for each of said conductors, said path including an electrolytic condenser, a spark gap, and a fuse connected in parallel with an additional spark gap.

7. The combination with the line conductors of a three phase distribution circuit, of a discharge path for said conductors including electrolytic condensers connected to a common point, and an additional electrolytic condenser connected between said point and ground.

8. The combination with conductors of a polyphase transmission system, of protective means connecting all of said conductors to a common point and a discharge path between said common point and ground, said path including an aluminum condenser cell and a shunt around said cell containing a fuse.

9. In combination, conductors of a polyphase transmission system, aluminum condenser cells connected between said conductors and a common point, a low resistance discharge path between said common point and ground, an aluminum cell in parallel with said path, and means for interrupting said path by a discharge of unusual severity.

In witness whereof, I have hereunto set my hand this 6th day of July, 1906.

ELMER E. F. CREIGHTON.

Witnesses:
BENJAMIN B. HULL,
HELEN ORFORD.